United States Patent Office 3,769,219
Patented Oct. 30, 1973

3,769,219
MANGANESE-ZINC FERRITE MATERIALS
Izuru Sugano, Yoshihiro Kenmoku, Tsuneo Akashi, Tetsujin Matsubara, and Taneaki Okuda, Tokyo, Japan, assignors to Nippon Electric Company Limited, Shiba Gochome, Tokyo, Japan
Continuation-in-part of application Ser. No. 34,968, May 6, 1970. This application Apr. 13, 1972, Ser. No. 243,596
Claims priority, application Japan, May 9, 1969, 44/36,367
The portion of the term of the patent subsequent to Mar. 28, 1989, has been disclaimed
Int. Cl. C04b *35/38*
U.S. Cl. 252—62.59                                              4 Claims

ABSTRACT OF THE DISCLOSURE

A manganese-zinc ferrite is provided having as a basic composition 30 to 38% MnO, 51 to 57% $Fe_2O_3$ and the balance essentially ZnO, the composition further containing by weight 0.01 to 0.5% $Co_2O_3$, 0 to 3.2% $SnO_2$, 0 (preferably 0.005) to 1.25% $Li_2O$, 0.02 to 0.5% CaO and 0.005 to 0.05% $SiO_2$.

---

This application is a continuation-in-part of U.S. application Ser. No. 34,968, filed May 6, 1970, now abandoned.

The present invention relates to manganese-zinc ferrite materials with greatly improved quality factors, hysteresis loss factors, and temperature coefficients of initial permeability.

STATE OF THE ART

As publicly known, manganese-zinc ferrites have found extensive use as soft magnetic materials for communications use in the frequency band up to near 100 kHz. However, unmodified manganese-zinc ferrites consisting only of the basic ingredients of manganese, zinc and iron oxides exhibit unsatisfactory quality factors, hysteresis loss factors and other magnetic properties. In order to meet the diversified fields of use, improvements in magnetic properties have been attempted by incorporating various additive agents into the basic manganese-zinc ferrite compositions.

A typical example of such improvements is disclosed in U.S. Pat. No. 3,106,534 (British Pat. 923,991, German publication 1,123,253, Dutch Pat. 108,427, French Pat. 1,246,679) in which the quality factor and the hysteresis loss factor are markedly improved by incorporation of the combined additive agents calcium oxide (CaO) and silicon oxide ($SiO_2$).

The rapid progress of present-day communications equipment has emphasized a need for miniaturization and better performance of magnetic cores and improved stability of magnetic materials, in order to meet the demands for wider operating temperature ranges of such equipment, and the development of materials having a constant temperature coefficient of the initial permeability over a wide temperature range is intensely desired.

The heretofore developed magnetic materials have been found to be insufficient to meet these requirements. For instance, the previously mentioned manganese-zinc ferrite compositions containing the two additives CaO and $SiO_2$ possessed better quality factor and hysteresis loss factor than had been obtained by that time, but, nevertheless, they have been outdated in the light of continuing demands for more excellent magnetic properties. Furthermore, they had a drawback in that the temperature range for securing a constant temperature coefficient of the initial permeability was considerably restricted.

It has also been reported that the addition of cobalt ions to the manganese-zinc ferrite compositions is effective for improving the temperature coefficient of the initial permeability. (In this connection, reference is made to British Pat. No. 1,092,009.) Cobalt incorporation is, however, still unsatisfactory for improvements of quality factor and hysteresis loss factor. In addition, it is difficult to obtain a desired and constant temperature coefficient over a wide temperature range by the incorporation of cobalt alone, and this may be attained only at the expense of degraded quality factor and increased hysteresis loss factor. These facts will be detailed later with reference to Table 1.

OBJECTS OF THE INVENTION

The object of the invention is, therefore, to provide improved manganese-zinc ferrite materials having small quality factor (tan $\delta/\mu$), low hysteresis loss factor ($h_{10}$) and low and constant temperature coefficient of initial permeability over a wide temperature range.

The other object of this invention is to provide improved manganese-zinc ferrite materials having at least one of the following stated magnetic properties, to wit: a small quality factor (tan $\delta/\mu$) less than $1.5 \times 10^{-6}$, a low hysteresis loss factor ($h_{10}$) less than 5 and a desired value between $0.3 \times 10^{-6}$ and $1.0 \times 10^{-6}$ of constant temperature coefficient of initial permeability $\Delta\mu/(\mu_{20}^2 . \Delta T)$ in the temperature range of $-20°$ C. to $80°$ C.

DETAILS OF THE INVENTION

This invention is characterized by the combined addition of cobalt, tin, lithium, calcium and silicon into basic manganese-zinc ferrite compositions. The amounts of these elements as oxides comprise 0.01 wt. percent $$\leq Co_2O_3 \leq 0.5$$

wt. percent, 0 wt. percent $< SnO_2 \leq 3.2$ wt. percent, 0 wt. percent $\leq Li_2O \leq 0.125$ wt. percent, 0.02 wt. percent $$\leq CaO \leq 0.5$$

wt. percent and 0.005 wt. percent $\leq SiO_2 \leq 0.05$ wt. percent, respectively, wt. percent being based on basic manganese-zinc ferrites containing no additives. It is preferred that the $SnO_2$ content be at least about 0.01 wt. percent and $Li_2O$ be at least about 0.005 wt. percent. The effective compositions of basic manganese-zinc ferrites are 30.0 mol percent to 38.0 mol percent MnO, 51.0 mol percent to 57.0 mol percent $Fe_2O_3$ and the balance ZnO. By taking advantage of the presence of the five additives, it is possible to control the temperature coefficient of initial permeability $\Delta\mu/(\mu_{20}^2 . \Delta T)$ of manganese-zinc ferrites from about $0.3 \times 10^{-6}$ to $1.0 \times 10^{-6}$ while maintaining a small quality factor and a low hysteresis loss factor. The quality factor and hysteresis loss factor may be lowered to below $1.5 \times 10^{-6}$ and below 5 at 100 kHz.

The manganese-zinc ferrites of this invention desirably have the following compositions and additives:

| | Mol percent |
|---|---|
| MnO: | 34.0–38.0 |
| $Fe_2O_3$ | 52.3–56.0 |
| ZnO: | Balance |
| $Co_2O_3$ | 0.03–0.5 |
| $SnO_2$ | 0.05–2.1 |
| $Li_2O$ | 0.02–0.1 |
| CaO | 0.025–0.18 |
| $SiO_2$ | 0.008–0.025 |

With such ferrites, a quality factor below $0.8 \times 10^{-6}$ and a hysteresis loss factor below 2.7 may be attained, while providing a desired value between $0.3 \times 10^{-6}$ and $1.0 \times 10^{-6}$ of the temperature coefficient of initial permeability, each value being measured at 100 kHz.

The manganese-zinc ferrites of this invention may provide a value of tan $\delta/\mu$ of less than $1.5 \times 10^{-6}$, a value of $h_{10}$ of less than 5 and a value of $\Delta\mu/(\mu_{20}^2 \cdot \Delta T)$ of between $0.3 \times 10^{-6}$ and $1.0 \times 10^{-6}$ with a small deviation less than ±20% in the temperature range of —20° C. to 80° C., each measured at 100 kHz., for compositions and additives within the ranges of the following Group I or II:

|  | I | II |
|---|---|---|
| MnO | 30–33 mol percent | 33–36 mol percent. |
| Fe₂O₃ | 52.0–54.0 percent | 53.5–55.0 percent. |
| ZnO | Balance | Balance. |
| Co₂O₃ | 0.01–0.2 wt. percent | 0.05–0.28 wt. percent. |
| SnO₂ | 0.5–1.4 wt. percent | 1.0–2.5 wt. percent. |
| Li₂O | 0.00, preferably 0.0005–0.06 wt. percent. | 0.025–0.1 wt. percent. |
| CaO | 0.02–0.25 wt. percent | 0.02–0.3 wt. percent. |
| SiO₂ | 0.005–0.03 wt. percent | 0.005–0.03 wt. percent. |

It is to be noted that the quality factor and the hysteresis loss factor as set forth in this specification are defined by the following equation:

$$\frac{R}{\omega L} = \frac{\tan \delta}{\mu} \cdot \mu_0 + h_{10} \left(\frac{\mu_e}{1000}\right)^{3/2} \sqrt{\frac{L}{V}} \cdot I$$

where

R = effective resistance of core ($\Omega$),
L = inductance of coil (H),
$\mu$ = initial permeability of core,
$\mu_e$ = effective permeability of core,
V = effecting volume of core (cm.³), and
I = measuring current (A).

The temperature coefficient of initial permeability $\Delta\mu/(\mu_{20}^2 \cdot \Delta T)$ as set forth in the specification is defined as follows:

The temperature range of —20° C.~80° C. is divided into equal 20 degrees centigrade intervals and the highest and lowest temperatures in each interval are referred to as $T_1$ and $T_2$. With respect to each of the five intervals divided, the temperature coefficient of initial permeability of a sample is determined according to the equation $$\Delta\mu/(\mu_{20}^2 \cdot \Delta T) = \frac{\mu_{T_1} - \mu_{T_2}}{20 \cdot \mu_{20^\circ C.}^2}$$

where $\mu_{T_1}$, $\mu_{T_2}$ and $\mu_{20^\circ C.}$ represent initial permeabilities at $T_1$, $T_2$ and 20° C., respectively. Among five values of temperature coefficients, maximum and minimum values are taken into account. An arithmetic mean of the two values is defined to be temperature coefficient of initial permeability of the sample. The deviation of temperature coefficient, which is indicated with the symbol ± after a value of temperature coefficient in each table of this specification, signifies the difference between the mean value and the maximum or minimum value.

Now, the invention will be described more in detail referring to examples and drawings. In the drawings.

Before describing the examples of the invention, the unsatisfactory results obtained by sole addition of cobalt will be described. Our experimental results are shown in Table 1, in which the values of quality factor (tan $\delta/\mu$), hysteresis loss factor ($h_{10}$), and temperature coefficient of initial permeability $\Delta\mu/(\mu_{20}^2 \cdot \Delta T)$ in the temperature range from minus 20° C. to plus 80° C. are listed for three different Mn-Zn ferrites containing cobalt ions in varying amounts which are added in the form of Co₂O₃.

TABLE 1

| Magnetic properties | Composition I | | | Composition II | | | Composition III | | |
|---|---|---|---|---|---|---|---|---|---|
|  | tan $\delta/\mu$, ×10⁻⁵ | H₁₀ | $\Delta\mu/(\mu_{20}^2 \cdot \Delta T)$ (−20–80° C.) ×10⁻⁶ | tan $\delta/\mu$, ×10⁻⁵ | H₁₀ | $\Delta\mu/(\mu_{20}^2 \cdot \Delta T)$ (−20–80° C.) ×10⁻⁶ | tan $\delta/\mu$, ×10⁻⁵ | H₁₀ | $\Delta\mu/(\mu_{20}^2 \cdot \Delta T)$ (−20–80° C.) ×10⁻⁶ |
| Amount of Co₂O₃ addition (wt. percent): | | | | | | | | | |
| 0 | 3.5 | 30.0 | 1.0±0.6 | 3.0 | 22.5 | 1.0±0.75 | 1.6 | 6.5 | 0.7±0.6 |
| 0.05 | 2.8 | 20.0 | 0.7±0.4 | 2.5 | 17.0 | 0.7±0.5 | 1.8 | 8.0 | 0.6±0.4 |
| 0.10 | 2.2 | 15.0 | 0.5±0.2 | 1.9 | 10.3 | 0.6±0.3 | 2.0 | 12.5 | 0.55±0.3 |
| 0.15 | 2.0 | 13.5 | 0.4±0.1 | 1.5 | 6.0 | 0.5±0.2 | 2.3 | 15.5 | 0.4±0.1 |
| 0.20 | 1.8 | 10.1 | 0.3±0.05 | 1.8 | 8.0 | 0.35±0.1 | 2.5 | 19.0 | 0.2±0.05 |
| 0.25 | 1.7 | 7.0 | 0.2±0.02 | 2.0 | 12.0 | 0.15±0.02 | 3.0 | 25.0 | 0.15±0.03 |
| 0.30 | 1.9 | 10.0 | 0.1±0.01 | 3.0 | 18.5 | 0.10±0.02 | 3.5 | 30.0 | 0.1±0.02 |

Note.—Composition I: 38.0 mol percent MnO, 6.5 mol percent ZnO, and 55.5 mol percent Fe₂O₃.
Composition II: 36.0 mol percent MnO, 9.5 mol percent ZnO, and 54.5 mol percent Fe₂O₃.
Composition III: 34.0 mol percent MnO, 13.0 mol percent ZnO, and 53.0 mol percent Fe₂O₃.

As will be seen from Table 1, a most favorable Co₂O₃ content for both tan $\delta/\mu$ and $h_{10}$ by no means agrees with that for $\Delta\mu/(\mu_{20}^2 \cdot \Delta T)$, while the least values of tan $\delta/\mu$ and $h_{10}$ that can be realized are substantially determined by the proportions of Fe₂O₃ and MnO, notably by the mol percent of MnO. On the other hand, the value of $\Delta\mu/(\mu_{20}^2 \cdot \Delta T)$ is substantially governed by the cobalt content. Therefore, it is almost impossible to vary the absolute value of $\Delta\mu/(\mu_{20}^2 \cdot \Delta T)$ which is in turn constant over a wide temperature range while keeping the excellent values $\delta/\mu$ and $h_{10}$, by way of sole incorporation of cobalt ions.

The effectiveness of this invention will be described in detail of the examples.

In Examples 1 through 5, the effect of the combined incorporation of SnO₂ and Li₂O will be examined and the optimum amounts thereof defined, for manganese-zinc ferrites having different basic compositions and containing suitably fixed amounts of Co₂O₃ and commonly fixed amounts of CaO and SiO₂. In example 6, there will be shown that the effective amounts of Co₂O₃ addition vary with the basic manganese-zinc ferrite compositions and the effective range of Co₂O₃ content will be defined. In Example 7, there will be indicated that both quality factor (tan $\delta/\mu$) and hysteresis loss factor ($h_{10}$) are improved by the combined addition of CaO and $SiO_2$ under the coexistence of the other additives $SnO_2$, $Li_2O$ and $Co_2O_3$ and the ranges of the effective addition for each of CaO and $SiO_2$ will be defined.

All samples used in the examples of this invention were prepared by the usual method of manufacturing sintered ferrities as will be mentioned.

Iron oxide, manganese carbonate, and zinc oxide as the basic constituents and some or all of the additive agents, cobalt oxide, tin oxide, lithium carbonate, calcium oxide and silicon oxide were weighed to obtain predetermined compositions and proportions and mixed in a ball mill for 60 hours with alcohol as a dispersion medium. The mixtures were presintered at 800° C. in air for 4 hours, followed by press-molding and sintering at 1180° C. in a nitrogen atmosphere containing 0.4 percent by volume oxygen for 8 hours. It will be noted here that all the samples used in Examples 1 through 6 contain 0.06 wt. percent calcium oxide and 0.02 wt. percent silicon oxide, although this is not clearly mentioned in each example.

Example 1

Figure 1:
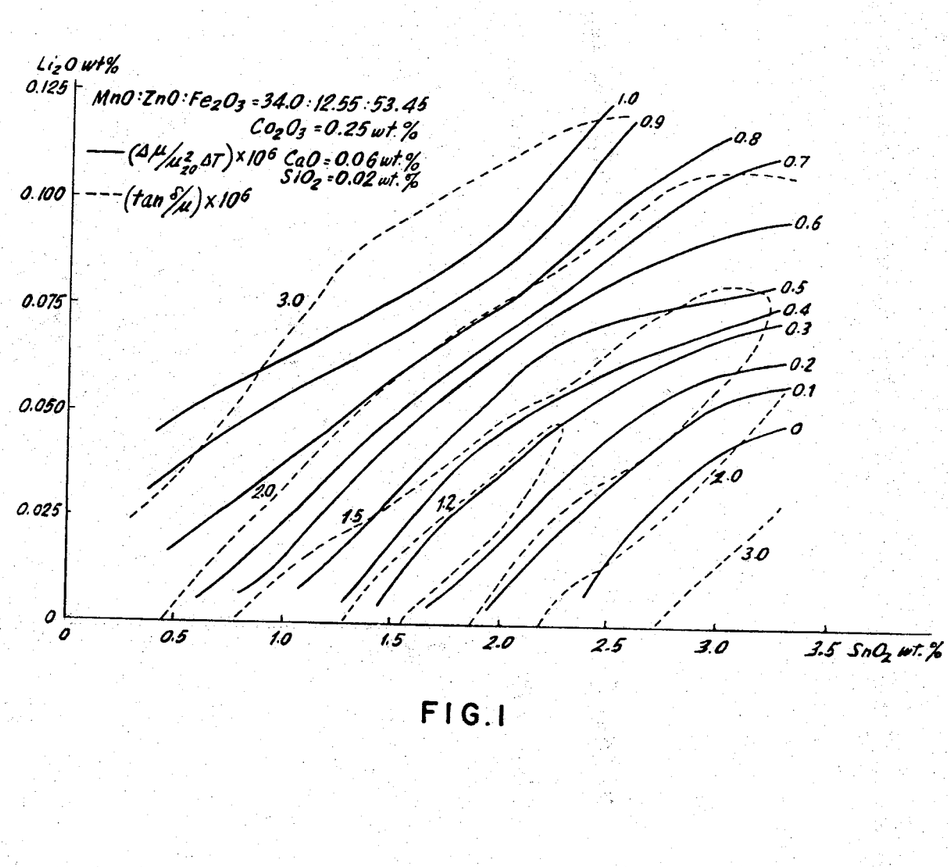
FIG. 1 shows to families of contours indicating values of tan $\delta/\mu$ and $\Delta\mu/\mu_{20}^2 \cdot \Delta T$ respectively for various proportions of SnO₂ and Li₂O, measured from manganese-zinc ferrites having a fixed basic composition and containing fixed amounts of Co₂O₃, CaO and SiO₂ and varying amounts of SnO₂ and Li₂O.
Figure 2:
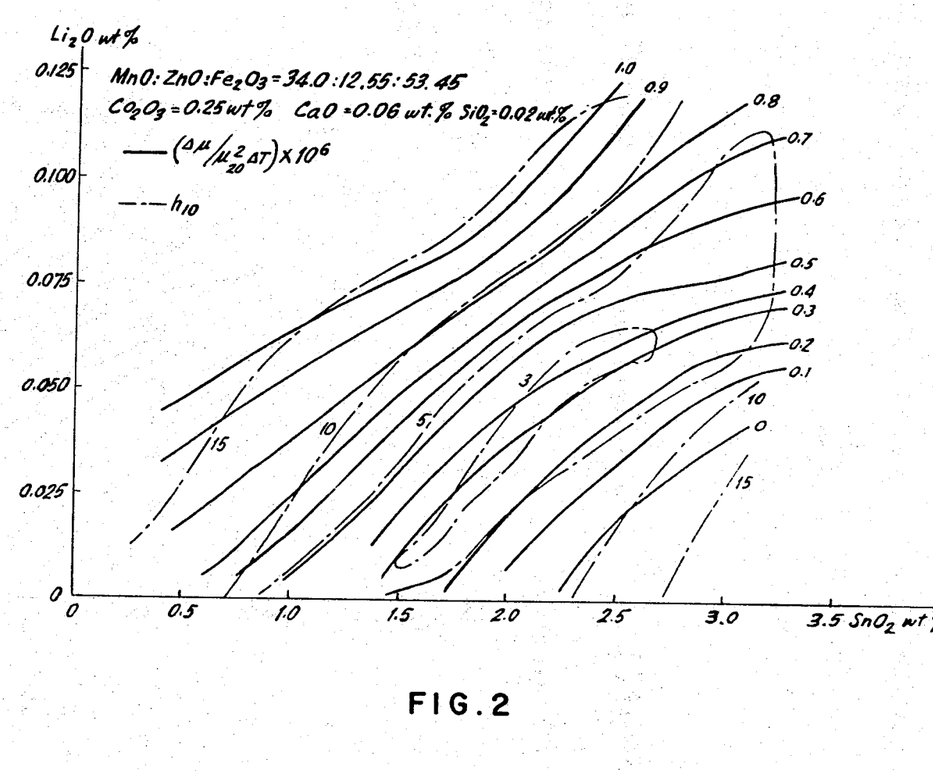
FIG. 2 illustrates two families of contours indicating the values of $h_{10}$ and $\Delta\mu/\mu_{20}^2 \cdot \Delta T$), respectively, for various proportions of SnO₂ and Li₂O, measured from the same ferrite as FIG. 1.

Referring to FIGS. 1 and 2 which show the values of tan $\delta/\mu$, $h_{10}$ and $\Delta\mu/(\mu_{20}^2.\Delta T)$ of manganese-zinc ferrites having a basic composition of 34.0 mol percent MnO, 12.55 mol percent ZnO and 53.45 mol percent $Fe_2O_3$ and containing 0.25 wt. percent $Co_2O_3$ and varying amounts of $SnO_2$ and $Li_2O$, in the ranges of 0~3.5 wt. percent and 0~0.125 wt. percent, respectively, each of the quality factor tan $\delta/\mu$, the hysteresis loss factor $h_{10}$ and the initial permeability temperature coefficient $\Delta\mu/\mu_{20}^2.\Delta T$ is markedly improved by the combined incorporation of $SnO_2$ and $Li_2O$ together with $Co_2O_3$, CaO and $SiO_2$. These figures reveal that new and improved manganese-zinc ferrite materials are successfully obtained having excellent properties heretofore not obtainable—that is, tan $\delta/\mu$ less than $1.5 \times 10^{-6}$, $h_{10}$ less than 5 and $\Delta\mu/\mu_{20}^2.\Delta T$) of any desired value between $0.2 \times 10^{-6}$ and $0.5 \times 10^{-6}$, each as measured at 100 kHz, by the combined incorporation in the ranges of 0.9 wt. percent $\leq SnO_2 \leq 3.2$ wt. percent and 0 wt. percent $\leq LiO_2 \leq 0.88$ wt. percent.

Example 2

Figure 3:
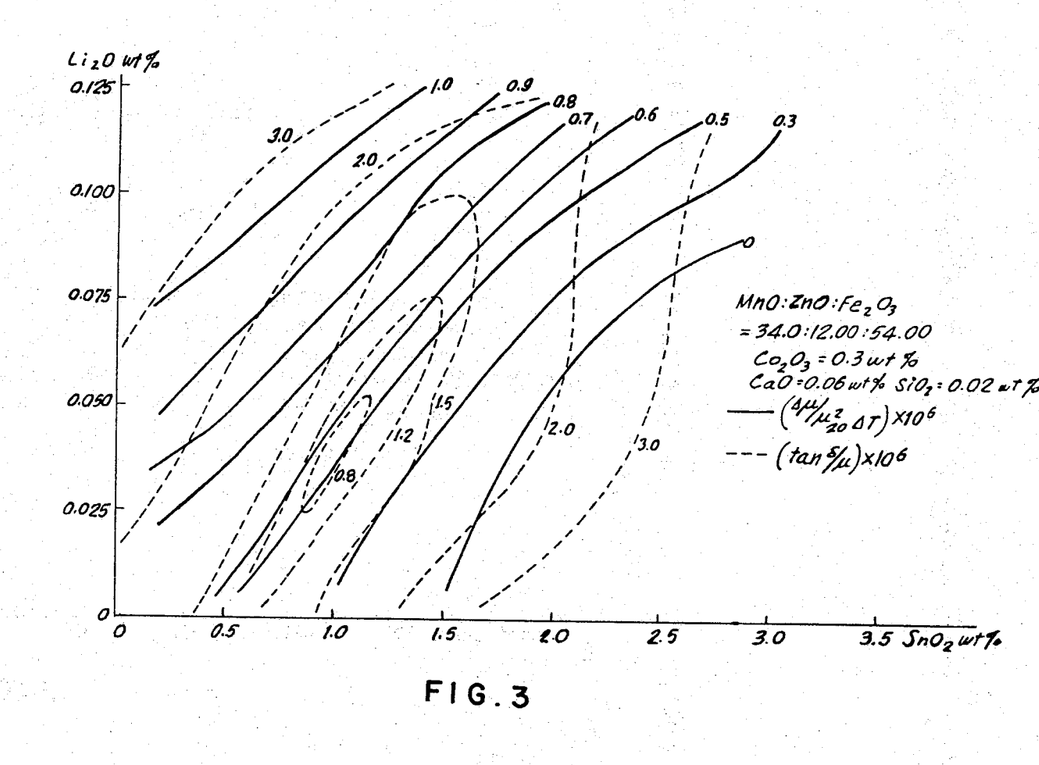
FIGS. 3 and 4 are graphs similar to FIGS. 1 and 2, respectively, measured from manganese-zinc ferrites with another basic composition and another amount of Co₂O₃.
Figure 4:
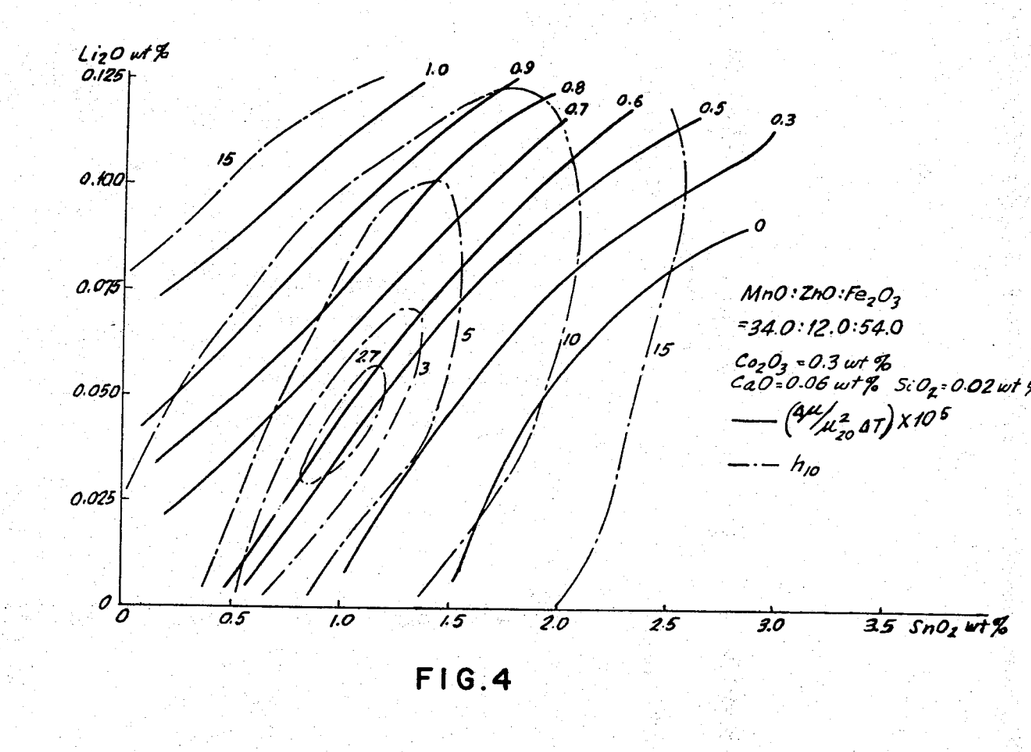

With reference to FIGS. 3 and 4 showing the values of tan $\delta/\mu$, $h_{10}$ and $\Delta\mu/(\mu_{20}^2.\Delta T)$ of manganese-zinc ferrites with a basic composition of 34.0 mol percent MnO, 12.00 mol percent ZnO and 54.00 mol percent $Fe_2O_3$ and containing 0.3 wt. percent $Co_2O_3$ and varying amounts of $SnO_2$ and $Li_2O$, 0~3 wt. percent and 0~0.13 wt. percent respectively, it will be readily understood that the combined addition of $Co_2O_3$, $SnO_2$, $Li_2O$, CaO and $SiO_2$ is equally quite effective for improvements of the quality factor, hysteresis loss factor and temperature cofficient of initial permeability, in spite of the fact that the proportion of $Fe_2O_3$ and ZnO in the basic composition is changed from that in the samples of Example 1.

As will be evident from these figures, we have succeeded in the preparation of manganese-zinc ferrite materials having better magnetic properties than have hitherto been obtained—that is, tan $\delta/\mu$ less than $1.5 \times 10^{-6}$, $h_{10}$ less than 5 and $\Delta\mu/(\mu_{20}^2.\Delta T)$ of any desired value between $0.3 \times 10^{-6}$ and $0.8 \times 10^{-6}$, each measured at 100 kHz., in the ranges of 0.4 wt. percent $\leq SnO_2 \leq 1.5$ wt. percent and 0 wt. T$\leq Li_2O \leq 0.1$ wt. percent.

A further inspection of these figures will reveal that, provided the amounts of the additives be confined within the ranges of 0.88 wt. percent $\leq SnO_2 \leq 1.16$ wt. percent and 0.03 wt. percent $\leq Li_2O \leq 0.053$ wt. percent, manganese-zinc ferrite materials with markedly improved magnetic properties are provided which may meet all of the requirements in which tan $\delta/\mu$ is less than $$0.8 \times 10^{-6},$$

$h_{10}$ is less than 2.7, and in which $\Delta\mu/(\mu_{20}^2.\Delta T)$ can be provided at any desired value between $0.5 \times 10^{-6}$ and $0.6 \times 10^{-6}$, each as measured at 100 kHz.

Example 3

Figure 5:
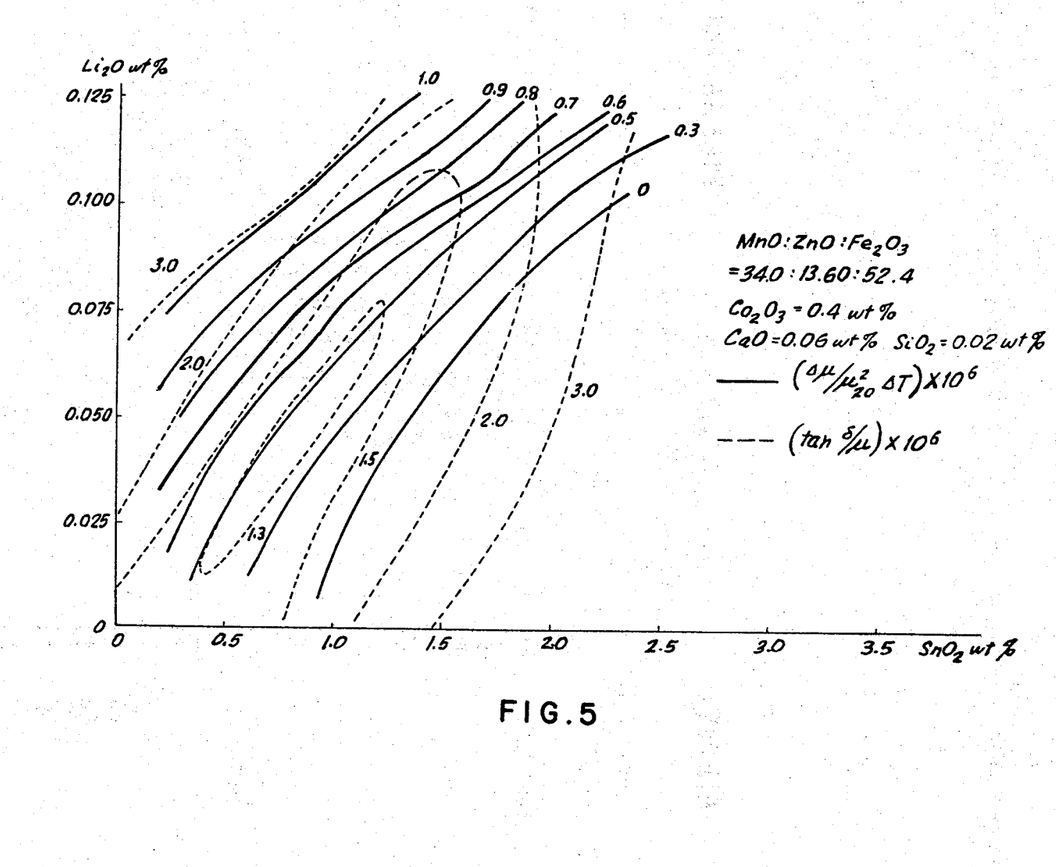
FIGS. 5 and 6 are graphs similar to FIGS. 1 and 2, respectively, measured from manganese-zinc ferrites of another basic composition and another amount of Co₂O₃.
Figure 6:
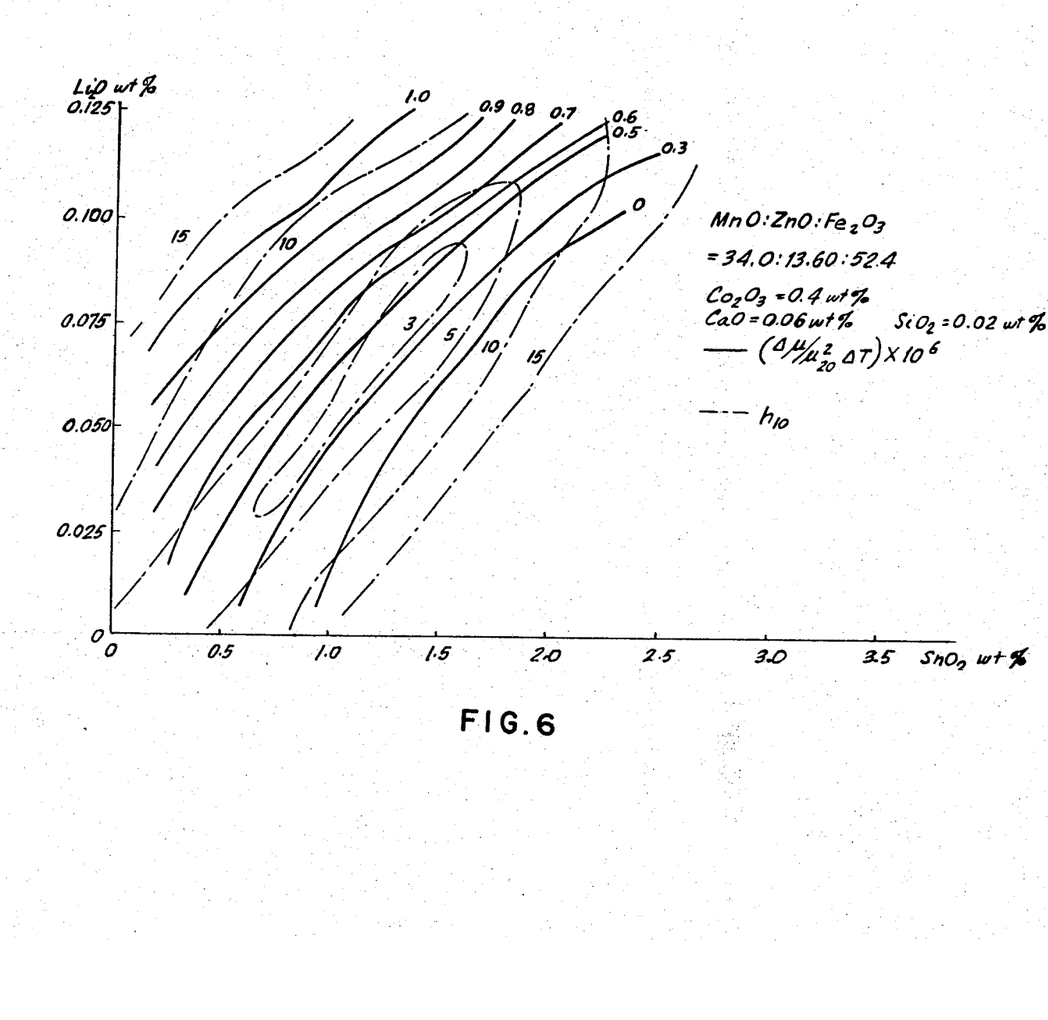

FIGS. 5 and 6 show the three magnetic properties of Mn-Zn ferrite samples having a basic composition of 34.0 mol percent MnO, 13.60 mol percent ZnO and 52.4 mol percent $Fe_2O_3$ and containing 0.4 wt. percent $Co_2O_3$ and varying amounts of $SnO_2$ and $Li_2O$, 0~2.5 wt. percent and 0~0.13 wt. percent, respectively. A comparison of these figures with those of Examples 1 and 2 will readily demonstrate that the combined addition of $Co_2O_3$, $SnO_2$, $Li_2O$, CaO and $SiO_3$ is extremely advantageous for simultaneous improvements of quality factor, hysteresis loss factor and temperature coefficent of initial permeability, irrespective of further change in the proportion of $Fe_2O_3$ and ZnO in the basic composition.

It will be seen from these figures that tan $\delta/\mu$ is less than $1.5 \times 10^{-6}$, $h_{10}$ is less than 5 and that $\Delta\mu/(\mu_{20}^2.\Delta T)$ having any desired value between $0.5 \times 10^{-6}$ and $0.7 \times 10^{-6}$ can be obtained in the ranges of 0 wt. percent $\leq SnO_2 \leq 1.6$ wt. percent and 0 wt. percent $\leq Li_2O \leq 0.11$ wt. percent.

Example 4

Figure 7:
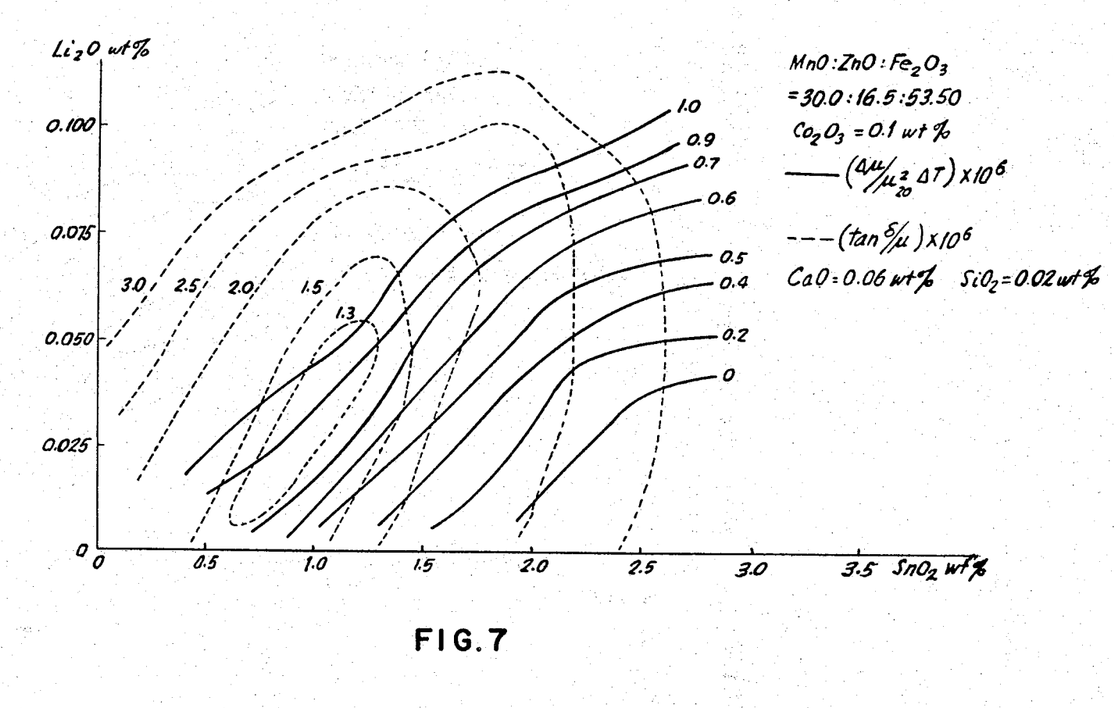
FIGS. 7 and 8 are graphs similar to FIGS. 1 and 2, respectively, measured from manganese-zinc ferrites with still another basic composition and still another amount of Co₂O₃.
Figure 8:
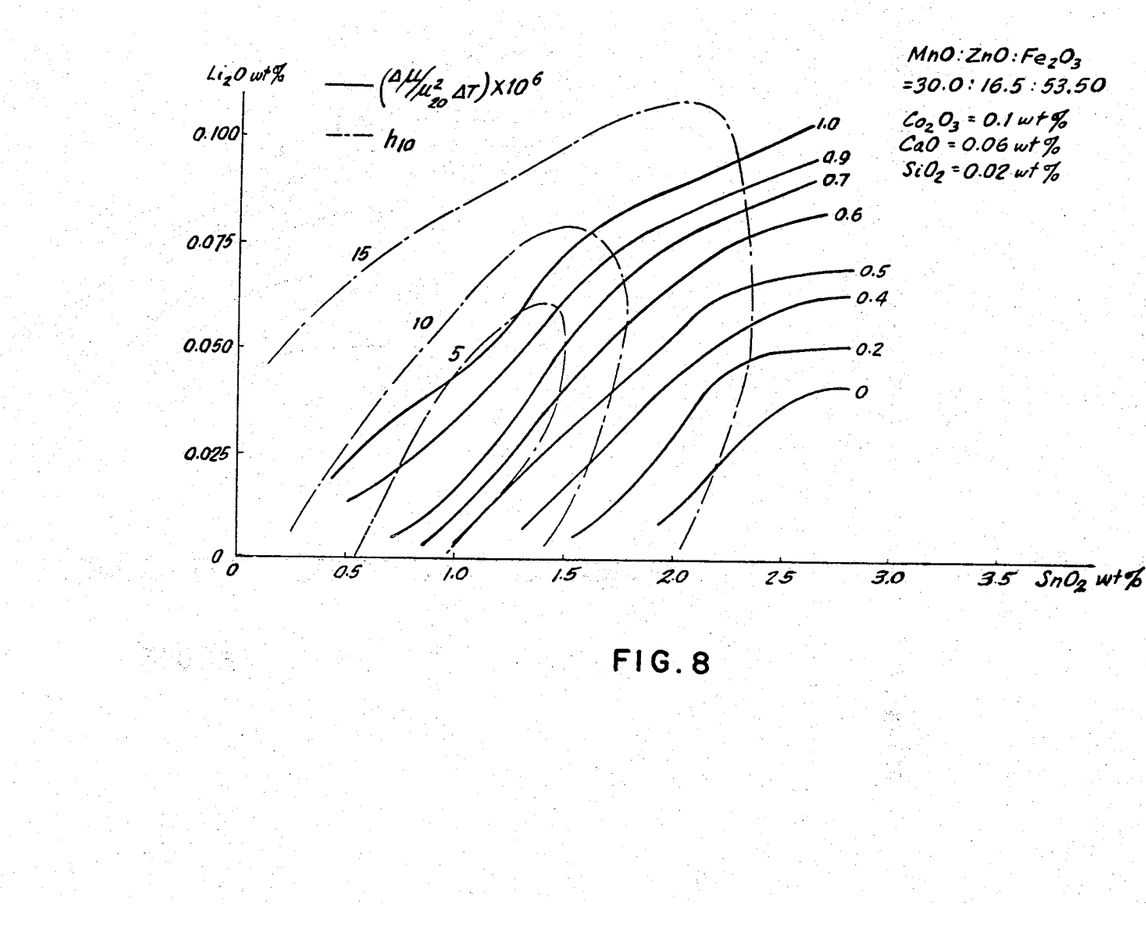

FIGS. 7 and 8 illustrate the values of tan $\delta/\mu$, $h_{10}$ and $\Delta\mu/(\mu_{20}^2.\Delta T)$ of Mn-Zn ferrite samples having a basic composition of 30.0 mol percent MnO, 16.5 mol percent ZnO and 53.5 mol percent $Fe_2O_3$ and containing 0.1 wt. percent $Co_2O_3$ and varying amounts of $SnO_2$ and $Li_2O$, in the ranges of 0~3.0 wt. percent and 0~0.12 wt. percent, respectively. A comparison of these figures with those of Examples 1, 2 and 3 readily reveals that the combined addition of $Co_2O_3$, $SnO_2$, $Li_2O$, CaO and $SiO_2$ is extremely advantageous for improvements of the quality factor, the hysteresis loss factor and the temperature coefficient of initail permeability, even where there is a reduced proportion of MnO in the basic composition.

An inspection of these figures also demonstrates that tan $\delta/\mu$ is less than $1.5 \times 10^{-6}$, that is $h_{10}$ is less than 5 and $\Delta\mu/(\mu_{20}^2.\Delta T)$ having any desired value between $0.5 \times 10^{-6}$ and $1.0 \times 1.0 \times 10^{-6}$ can be attained in the amounts of 0.5 wt. percent $\leq SnO_2 \leq 1.4$ wt. percent and 0 wt. percent $\leq Li_2O \leq 0.06$ wt. percent.

Example 5

Figure 9:
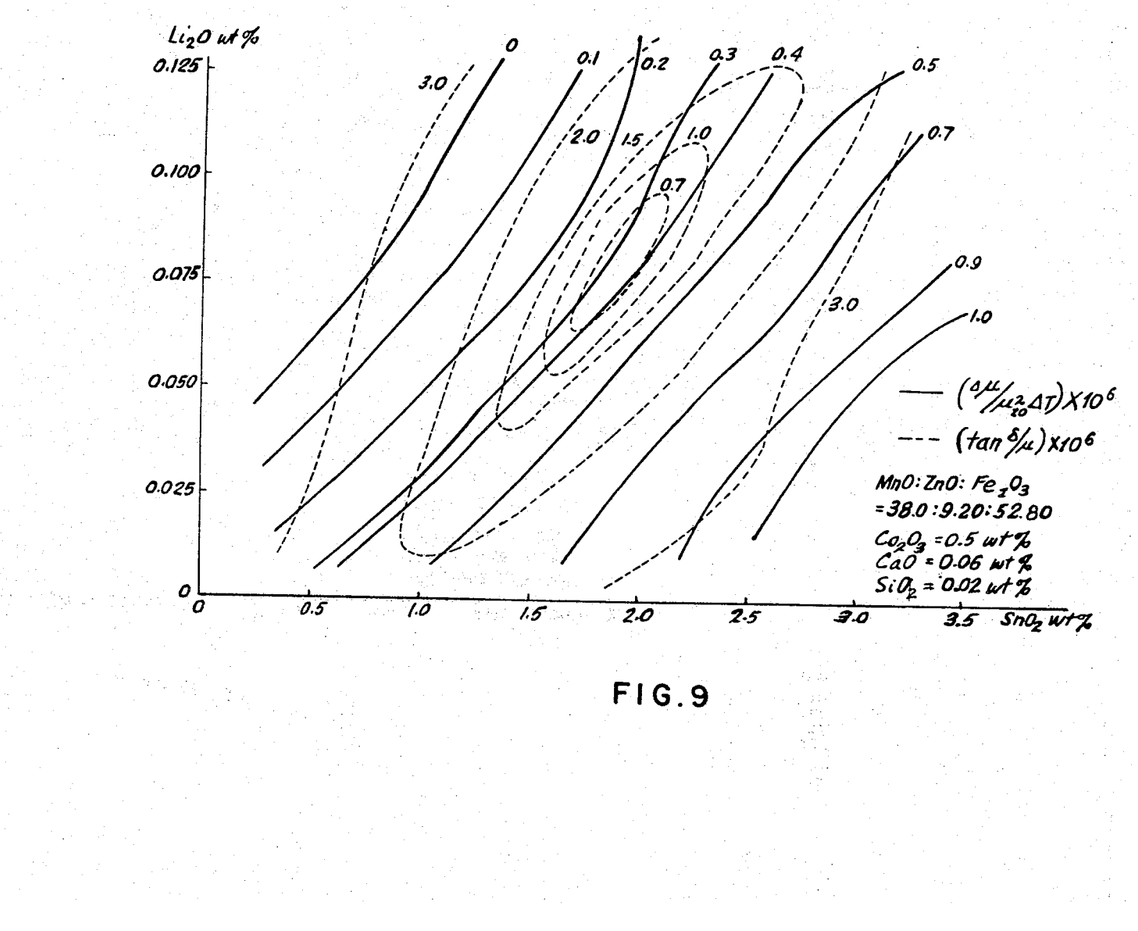
FIGS. 9 and 10 are graphs similar to FIGS. 1 and 2, respectively, measured from manganese-zinc ferrites with still another basic composition and still another amount of Co₂O₃.
Figure 10:
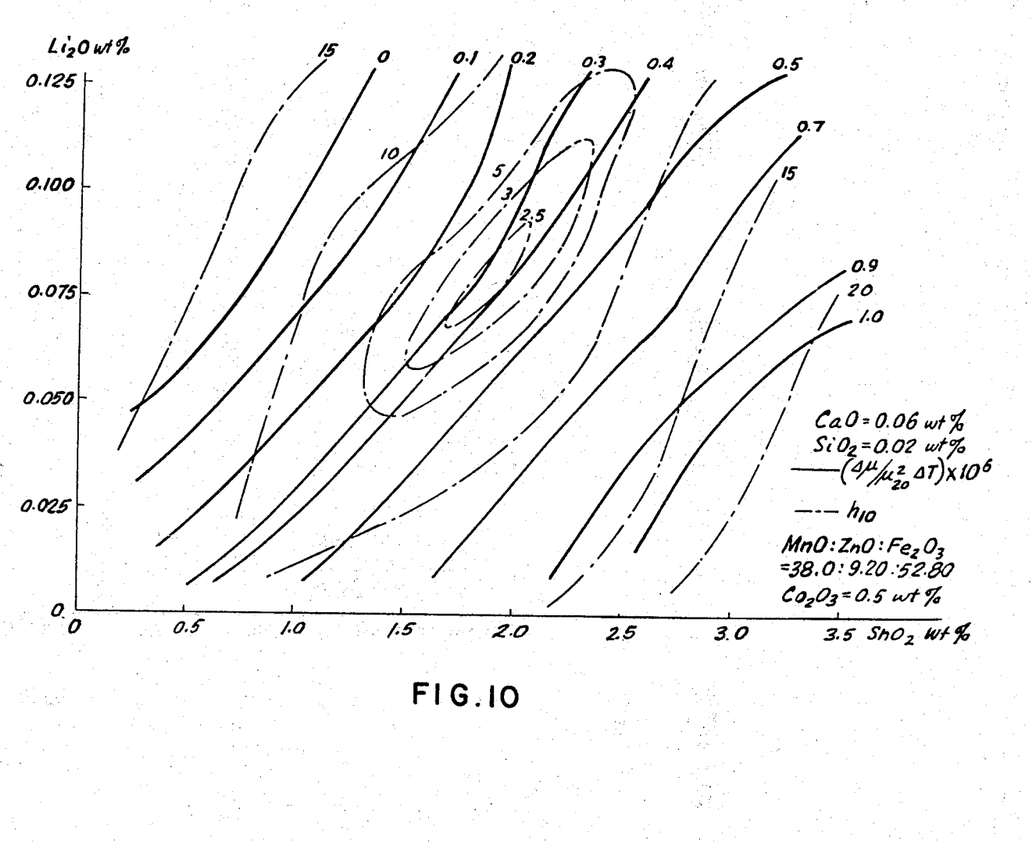

Referring to FIGS. 9 and 10 which show contours of the three magnetic properties of Mn-Zn ferrite samples having a basic composition of 38.0 mol percent MnO, 9.20 mol percent ZnO and 52.8 mol percent $Fe_2O_3$ and containing 0.5 wt. percent $Co_2O_3$ and varying amounts of $SnO_2$ and $Li_2O$, in the ranges from 0 to 3.5 wt. percent and from 0 to 0.13 wt. percent, respectively, the combined addition of $Co_2O_3$, $SnO_2$, $Li_2O$, CaO and $SiO_2$ is effective for improvement of each of the quality factor, the hysteresis loss factor and the initial permeability temperature coefficient, even where the MnO content in the basic composition is increased as compared with the samples of Examples 1 through 4.

As will be evident from these figures tan $$\delta/\mu \leq 1.5 \times 10^{-6}$$

$h_{10} \leq 5$ and $\Delta\mu/(\mu_{20}^2 \cdot \Delta T)$ having any desired value between $0.25 \times 10^{-6}$ and $0.45 \times 10^{-6}$ can be obtained in the ranges of 1.4 wt. percent $\leq SnO_2 \leq 2.5$ wt. percent and 0.05 wt. percent $\leq Li_2O \leq 0.125$ wt. percent.

A close inspection of these figures further reveals that, by confining the amounts of the two additives $SnO_2$ and $Li_2O$ within the range of 1.83 wt. percent $\leq SnO_2 \leq 2.05$ wt. percent and 0.073 wt. percent $\leq Li_2O \leq 0.09$ wt. percent, improved manganese-zinc ferrites can be obtained which may meet all of the requirements that tan $\delta/\mu$ is less than $0.7 \times 10^{-6}$ that $h_{10}$ is less than 2.5 and that $\Delta\mu/(\mu_{20}^2 \cdot \Delta T)$ can be taken at any desired value between $0.3 \times 10^{-6}$ and $0.4 \times 10^{-6}$, each as measured at 100 kHz.

It has been demonstrated in Examples 1 through 5 that both of quality factor and hysteresis loss factor can be markedly improved and at the same time $\Delta\mu/(\mu_{20}^2 \cdot \Delta T)$ can be varied at will, by the addition of $SnO_2$ and $Li_2O$ both in varying amounts, $Co_2O_3$ in suitably fixed amounts and $CaO$ and $SiO_2$ in fixed amounts and further that the amounts of addition of $SnO_2$ and $Li_2O$ most effective for improvements of these magnetic properties vary with changes in the basic Mn-Zn ferrite compositions. From Example 1, it will be apparent that $\tan \delta/\mu$ at values less than $1.5 \times 10^{-6}$ and $h_{10}$ at values less than 5 can be attained by incorporation of $SnO_2$ in an amount not exceeding 3.2 wt. percent if the basic compositions and/or amounts of incorporation of the other additives are suitably selected. Example 3 also indicates that the similar properties can be obtained without the incorporation of $SnO_2$. On the other hand, Example 5 shows that the incorporation of $Li_2O$ not exceeding 0.125 wt. percent brings about the abovementioned excellent properties if the other factors are determined in a suitable manner. However, $Li_2O$ can be decreased to zero for the same purpose if $SnO_2$ is present in the ferrite, as will be apparent from Examples 1 to 4 and Nos. 1 to 4 of Table 2. Thus, the amounts of incorporation of $SnO_2$ and $Li_2O$ should be restricted to the ranges of 0 wt. percent $<SnO_2 \leq 3.2$ wt. percent and 0 wt. percent $\leq Li_2O \leq 0.125$ wt. percent, respectively.

In order to ensure the reproducibility of Mn-Zn ferrites having desired values of the aforementioned magnetic properties, it is beneficial to have both $SnO_2$ and $Li_2O$ present together with the other additives in the ferrites. In this respect, the amounts of $SnO_2$ and $Li_2O$ employed are preferably at least about 0.01 wt. percent and at least about 0.005 wt. percent, respectively.

Sample Nos. 5 and 6 of Table 2 show the magnetic properties of Mn-Zn ferrite samples in which 0.01 wt. percent $SnO_2$ and 0.005 wt. percent $Li_2O$ are both present.

TABLE 4

| Weight percent | | | $\tan \delta/\mu$, $\times 10^{-6}$ | $h_{10}$ | $\mu/\mu_{20}^2 \cdot \Delta T$ $(-20-80°$ C.$)$ $\times 10^{-6}$ |
|---|---|---|---|---|---|
| $Co_2O_3$ | $SnO_2$ | $Li_2O$ | | | |
| 0.005 | 3.5 | 0.100 | 1.9 | 12.0 | (1.0±0.8) |
| 0.01 | 3.0 | 0.075 | 1.7 | 10.0 | (0.9±0.6) |
| 0.1 | 2.5 | 0.050 | 1.5 | 7.0 | (0.7±0.3) |
| 0.3 | 2.0 | 0.075 | 1.3 | 5.0 | (0.6±0.1) |
| 0.5 | 0.5 | 0.075 | 1.45 | 5.0 | (0.5±0.06) |
| 0.5 | 1.2 | 0.100 | 1.5 | 10.0 | (0.3±0.03) |
| 0.6 | 0.5 | 0.100 | 2.5 | 20.0 | (0.2±0.03) |
| 0.6 | 1.5 | 0.152 | 3.0 | 30.0 | (0.1±.01) |

Tables 3 and 4 indicate the fact that the temperature coefficient of initial permeability can be controlled by varying the content of each of the additives $Co_2O_3$, $SnO_2$ and $Li_2O$. As is evident from Table 3, deviation from the mean value of $\Delta\mu/(\mu_{20}^2 \cdot \Delta T)$ becomes considerably large (in excess of ± 50% of the mean value). Moreover, the other properties become degraded where a content of $Co_2O_3$ is below 0.01 wt. percent. It will be noted that Table 4 shows that $\tan \delta/\mu$ and $h_{10}$ each increases to more than $1.5 \times 10^{-6}$ and 5, respectively, where the $Co_2O_3$ content exceeds 0.5 wt. percent. From this experimental fact, the lower and upper limits of the $Co_2O_3$ content effective for improvements of the magnetic properties have been determined as 0.01 and 0.5 wt. percent, respectively. Although the effective $Co_2O_3$ content varies with proportions of $Fe_2O_3$ and $MnO$ in the basic composition, it is possible to obtain Mn-Zn ferrites having excellent values of quality factor and hysteresis loss factor and a constant temperature coefficient of initial permeability, provided that the amount of $Co_2O_3$ is in the range of 0.01 wt. percent $\leq Co_2O_3 \leq 0.5$ wt. percent.

Example 7

Figure 11:
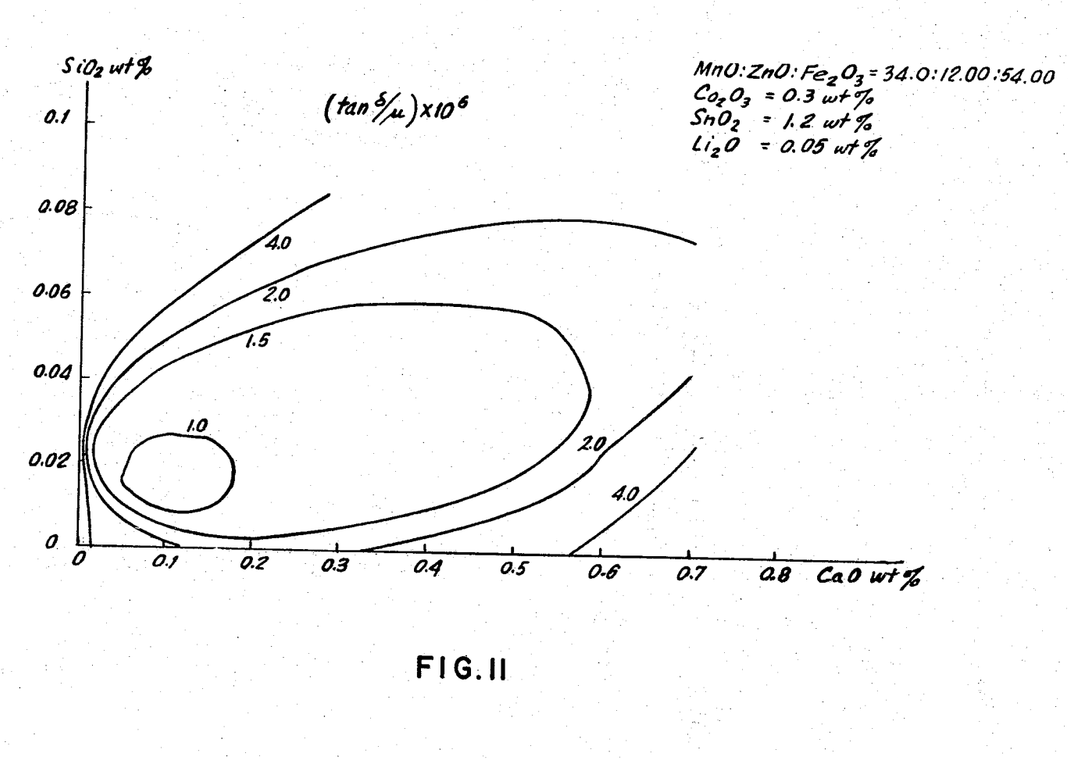
FIG. 11 shows values of tan $\delta/\mu$ as a function of the proportions of CaO and SiO₂ for manganese-zinc ferrites having the basic composition the same as in FIGS. 3 and 4 and containing fixed amounts of Co₂O₃, SnO₂ and Li₂O and varying amounts of CaO and SiO₂.
Figure 12:
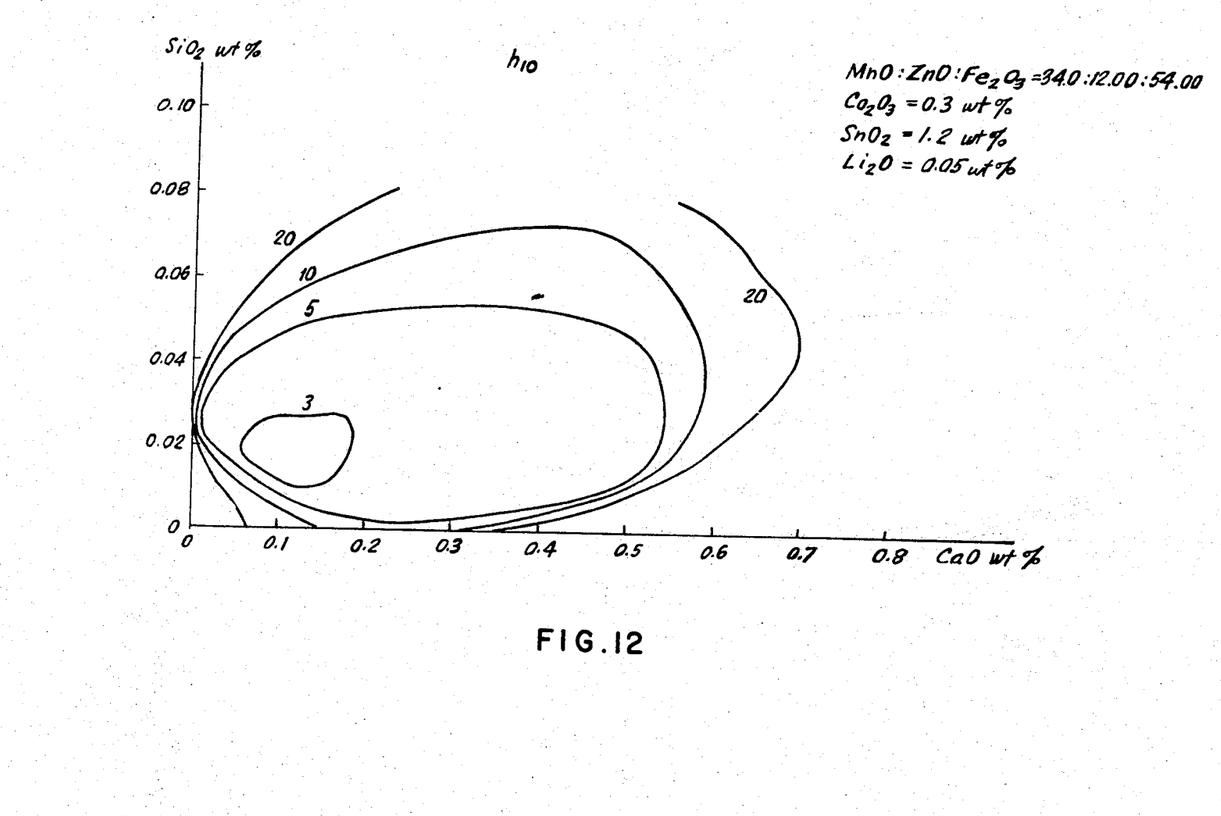
FIG. 12 shows contours of the values of $h_{10}$ as a function of the proportions of CaO and SiO₂ for the same ferrites as FIG. 11.

FIGS. 11 and 12 illustrate, respectively, the values of $\tan \delta/\mu$ and $h_{10}$ of Mn-Zn ferrite samples having a basic composition of 54.00 mol percent $Fe_2O_3$, 34.0 mol percent MnO and 12.00 mol percent ZnO and containing 0.3 wt. percent $Co_2O_3$, 1.2 kt. percent $SnO_2$, 0.05 wt. percent $Li_2O$ and varying amounts of CaO and $SiO_2$, in the ranges of 0–0.7 wt. percent and 0–0.08 wt. percent, respectively. Table 5 shows the values of $\Delta\mu/(\mu_{20}^2 \cdot \Delta T)$ of the same samples.

TABLE 2

| No. | Basic composition., mol percent | | | Additives, weight percent | | | | | Magnetic properties | | |
|---|---|---|---|---|---|---|---|---|---|---|---|
| | MnO | ZnO | $Fe_2O_3$ | $Co_2O_3$ | $SnO_2$ | $Li_2O$ | CaO | $SiO_2$ | $\tan/\mu$ $\times 10^{-6}$ | $h_{10}$ | $\Delta\mu/\mu_{20}^2 \cdot \Delta T(-20-$ $80°$ C.$)\times 10^{-6}$ |
| 1 | 30.0 | 16.5 | 53.5 | 0.1 | 0.7 | | 0.06 | 0.02 | 1.4 | 4.5 | 0.6±0.11 |
| 2 | 34.0 | 12.0 | 54.0 | 0.3 | 0.6 | | 0.06 | 0.02 | 1.2 | 3.0 | 0.5±0.16 |
| 3 | 34.0 | 12.7 | 53.3 | 0.23 | 0.8 | | 0.06 | 0.02 | 1.3 | 3.4 | 0.4±0.06 |
| 4 | 34.0 | 12.85 | 53.15 | 0.23 | 1.0 | | 0.06 | 0.02 | 1.35 | 3.7 | 0.72±0.11 |
| 5 | 34.0 | 11.5 | 54.5 | 0.4 | 0.01 | 0.01 | 0.06 | 0.02 | 1.4 | 4.0 | 0.75±0.13 |
| 6 | 34.0 | 12.5 | 53.85 | 0.35 | 0.6 | 0.005 | 0.06 | 0.02 | 1.4 | 4.5 | 0.55±01 |

Example 6

This experiment has verified that the value of the temperature coefficient of initial permeability can be controlled by varying the contents of $Co_2O_3$, $SnO_2$ and $Li_2O$ in a Mn-Zn ferrite composition while maintaining the excellent values of $\tan \delta/\mu$ and $h_{10}$.

Table 3 lists the values of $\tan \delta/\mu$, $h_{10}$ and $\Delta\mu/(\mu_{20}^2 \cdot \Delta T)$ taken from Mn-Zn ferrite samples containing the specified amounts of $Co_2O_3$, $SnO_2$ and $Li_2O$ and the fixed amounts of CaO and $SiO_2$ and which have a basic composition of 54.0 mol percent $Fe_2O_3$, 30.0 mol percent MnO and 16.0 mol percent ZnO. Table 4 shows the similar values of Mn-Zn ferrites having a basic composition of 53.3 mol percent $Fe_2O_3$, 38.0 mol percent MnO and 8.7 mol percent ZnO and containing the specified amounts of $Co_2O_3$, SnO and $Li_2O$ and the fixed amounts of CaO and $SiO_2$.

TABLE 3

| Weight percent | | | $\tan \delta/\mu$, $\times 10^{-6}$ | $h_{10}$ | $\mu/\mu_{20}^2 \cdot \Delta T$ $(-20-80°$ C.$)$ $\times 10^{-6}$ |
|---|---|---|---|---|---|
| $Co_2O_3$ | $SnO_2$ | $Li_2O$ | | | |
| 0.005 | 3.0 | 0.010 | 2.2 | 15.0 | (0.7±0.50) |
| 0.005 | 3.5 | 0.020 | 2.0 | 10.0 | (0.6±0.30) |
| 0.01 | 2.5 | 0.050 | 1.5 | 5.0 | (0.5±0.10) |
| 0.01 | 2.0 | 0.075 | 1.5 | 4.5 | (0.45±0.07) |
| 0.1 | 1.3 | 0.050 | 1.4 | 4.0 | (0.30±0.05) |
| 0.2 | 1.0 | 0.100 | 2.0 | 9.5 | (0.20±0.03) |
| 0.4 | 0.5 | 0.125 | 2.5 | 17.0 | (0.10±0.22) |

TABLE 5

| Weight percent | | $\Delta\mu/(\mu_{20}^2 \cdot \Delta T)$ $(-20-80°$ C.$)$ $\times 10^{-6}$ |
|---|---|---|
| CaO | $SiO_2$ | |
| 0.02 | 0.02 | 0.5±0.10 |
| 0.2 | 0.02 | 0.5±0.05 |
| 0.4 | 0.02 | 0.5±0.08 |
| 0.5 | 0.02 | 0.5±0.13 |
| 0.2 | 0.005 | 0.5±0.09 |
| 0.2 | 0.03 | 0.5±0.07 |
| 0.2 | 0.04 | 0.5±0.10 |
| 0.2 | 0.05 | 0.5±0.15 |

It can be seen from FIGS. 11 and 12 that the combined addition of CaO and $SiO_2$ has an outstanding effect for improving each of $\tan \delta/\mu$ and $h_{10}$. Moreover, it has been confirmed that ranges of CaO and $SiO_2$ contents effective for obtaining the values of $\tan \delta/\mu \leq 1.5 \times 10^{-6}$ and $h_{10} \leq 5$ in the presence of $Co_2O_3$, $SnO_2$ and $Li_2O$, in amounts of 0.02–0.55 wt. percent and 0.005–0.055 wt. percent, respectively, from FIGS. 11 and 12, are wider than the case where $Co_2O_3$, $SnO_2$ and $Li_2O$ are not present.

Table 5 reveals that the addition of CaO and $SiO_2$ has little effect on the temperature coefficient of initial permeability. Although the deviation from the mean value of temperature coefficient becomes a little larger as the amounts of CaO and $SiO_2$ are larger or lesser than 0.2 wt. percent, respectively, as shown in Table 5, the deviation can be reduced by varying the amounts of one or more of the additives $Co_2O_3$, $SnO_2$ and $Li_2O$. This variation, however, does not materially affect the values of tan $\delta/\mu$ and $h_{10}$.

The addition of CaO and $SiO_2$ is effective in the ranges of 0.02–0.55 wt. percent and 0.005–0.055 wt. percent, as mentioned above. However, the deviation of the temperature coefficient becomes considerably large if the CaO and $SiO_2$ contents exceed 0.5 wt. percent and 0.05 wt. percent, respectively. The effective ranges of CaO and $SiO_2$ are thus defined as $0.02 \leq CaO \leq 0.5$ and $0.005 \leq SiO_2 \leq 0.05$, respectively.

In Examples 1 through 7 the effective ranges of the five additives have been defined. As for the basic composition, compositions of 30.0 to 38.0 mol percent MnO, 51.0 to 57.0 mol percent $Fe_2O_3$ and the balance ZnO are favorable. The compositions with the upper and lower limits of MnO have already been exemplified. Table 6 shows examples of the compositions having the upper and lower limits of $Fe_2O_3$.

The extensive experiments of the inventors have shown that manganese-zinc ferrites with a basic composition of 34.0 to 38.0 mol percent MnO, 52.3 to 56.0 mol percent $Fe_2O_3$ and the balance ZnO and containing 0.03 to 0.5 wt. percent $Co_2O_3$, 0.5 to 2.1 wt. percent $SnO_2$, 0.02 to 0.1 wt. percent $Li_2O$, 0.025 to 0.18 wt. percent CaO and 0.008 to 0.025 wt. percent $SiO_2$ may have far superior magnetic properties. The values of tan $\delta/\mu$ less than $0.8 \times 10^{-6}$, $h_{10}$ less than 2.7 and $\Delta\alpha(\mu_{20}^2 . \Delta T)$ between $0.3 \times 10^{-6}$ and $1.0 \times 10^{-6}$ can be realized by suitably selecting a basic ferrite composition and amounts of the additives within the mentioned ranges. It has also been found experimentally than tan $\delta/\mu$ less than $1.5 \times 10^{-6}$, $h_{10}$ less than 5 and $\Delta\alpha(\mu_{20}^2.\Delta T)$ between $0.3 \times 10^{-6}$ and $1.0 \times 10^{-6}$ with the deviation less than $\pm 20\%$ can be easily obtained with ferrites having a basic composition of 30.0 to 33.0 mol percent MnO, 52.0 to 54.0 mol percent $Fe_2O_3$ and the balance ZnO and containing 0.01 to 0.2 wt. percent $Co_2O_3$, 0.5 to 1.4 wt. percent $SnO_2$, 0.00 (preferably 0.005) to 0.06 wt. percent $Li_2O$, 0.02 to 0.25 wt. percent CaO and 0.005 to 0.03 wt. percent $SiO_2$ or with the ferrites having a basic composition of 33.0 to 36.0 mol percent MnO, 53.5 to 55.0 mol percent $Fe_2O_3$ and the balance ZnO and containing 0.05 to 0.28 wt. percent $Co_3O_3$, 1.0 to 2.5 wt. percent $SnO_2$, 0.025 to 0.1 wt. percent $Li_2O$, 0.02 to 0.3 wt. percent CaO and 0.005 to 0.03 wt. percent $SiO_2$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A manganese-zinc ferrite consisting essentially of a basic composition of 30 to 38 mol percent MnO, 51 to 57 mol percent $Fe_2O_3$ and the balance ZnO and further containing by weight the additives 0.01 to 0.5% $Co_2O_3$, 0.01 to 3.2% $SnO_2$, 0.005 to 0.125% $Li_2O$, 0.02 to 0.5% CaO and 0.005 to 0.05% $SiO_2$.

2. A manganese-zinc ferrite consisting essentially of a basic composition of 34 to 38 mol percent MnO, 52.3 to 56 mol percent $Fe_2O_3$ and the balance ZnO and further containing by weight the additives 0.03 to 0.5% $Co_2O_3$, 0.5 to 2.1% $SnO_2$, 0.02 to 0.1% $Li_2O$, 0.025 to 0.18% CaO and 0.008 to 0.025% $SiO_2$.

3. A manganese-zinc ferrite consisting essentially of a basic composition of 30 to 33 mol percent MnO, 52 to 54 mol percent $Fe_2O_3$ and the balance ZnO and further containing by weight the additives 0.01 to 0.2% $Co_2O_3$, 0.5 to 1.4% $SnO_2$, 0.005 to 0.06% $Li_2O$, 0.02 to 0.25% CaO and 0.005 to 0.03% $SiO_2$.

4. A manganese-zinc ferrite consisting essentially of a basic composition of 33 to 36 mol percent MnO, 53.5 to 55 mol percent $Fe_2O_3$ and the balance ZnO and further containing by weight the additives 0.05 to 0.28% $Co_2O_3$, 1.0 to 2.5% $SnO_2$, 0.025 to 0.1% $Li_2O$. 0.02 to 0.3% CaO and 0.005 to 0.03% $SiO_2$.

TABLE

| Basic composition, mol percent | | | Additives, weight percent | | | | | Magnetic properties | | |
| --- | --- | --- | --- | --- | --- | --- | --- | --- | --- | --- |
| MnO | ZnO | $Fe_2O_3$ | $Co_2O_3$ | $SnO_2$ | $Li_2O$ | CaO | $SiO_2$ | tan $\delta/\mu$ $\times 10^{-6}$ | $h_{10}$ | $\Delta\mu/\mu_{20}^2 . \Delta T$ ($-20$–$80°$ C.) $\times 10^{-6}$ |
| 30.0 | 19.0 | 51.0 | 0.5  | 3.0 | 0.1  | 0.06 | 0.02 | 1.0 | 4 | 0.8±0.05 |
| 30.0 | 19.0 | 51.0 | 0.5  | 3.0 | 0.1  | 0.06 | 0.04 | 1.5 | 5 | 0.8±0.07 |
| 36.0 | 7.0  | 57.0 | 0.02 | 2.0 | 0.06 | 0.05 | 0.02 | 1.3 | 5 | 0.5±0.05 |
| 36.0 | 7.0  | 57.0 | 0.02 | 2.0 | 0.06 | 0.1  | 0.02 | 1.0 | 3 | 0.5±0.07 |
| 36.0 | 7.0  | 57.0 | 0.02 | 2.0 | 0.06 | 0.4  | 0.02 | 1.5 | 5 | 0.5±0.1 |

References Cited

UNITED STATES PATENTS 3,652,416   3/1972   Sugano et al. ______ 252—62.9
3,574,116   4/1971   Sugano et al. ______ 252—62.9

OSCAR R. VERTIZ Primary Examiner

J. COOPER, Assistant Examiner

U.S. Cl. X.R.

252—62.61, 62.62, 62.63, 62.56